July 26, 1966  H. B. COLLINS, JR., ET AL  3,263,173
DOPPLER EFFECT COMPENSATION
Filed July 31, 1961
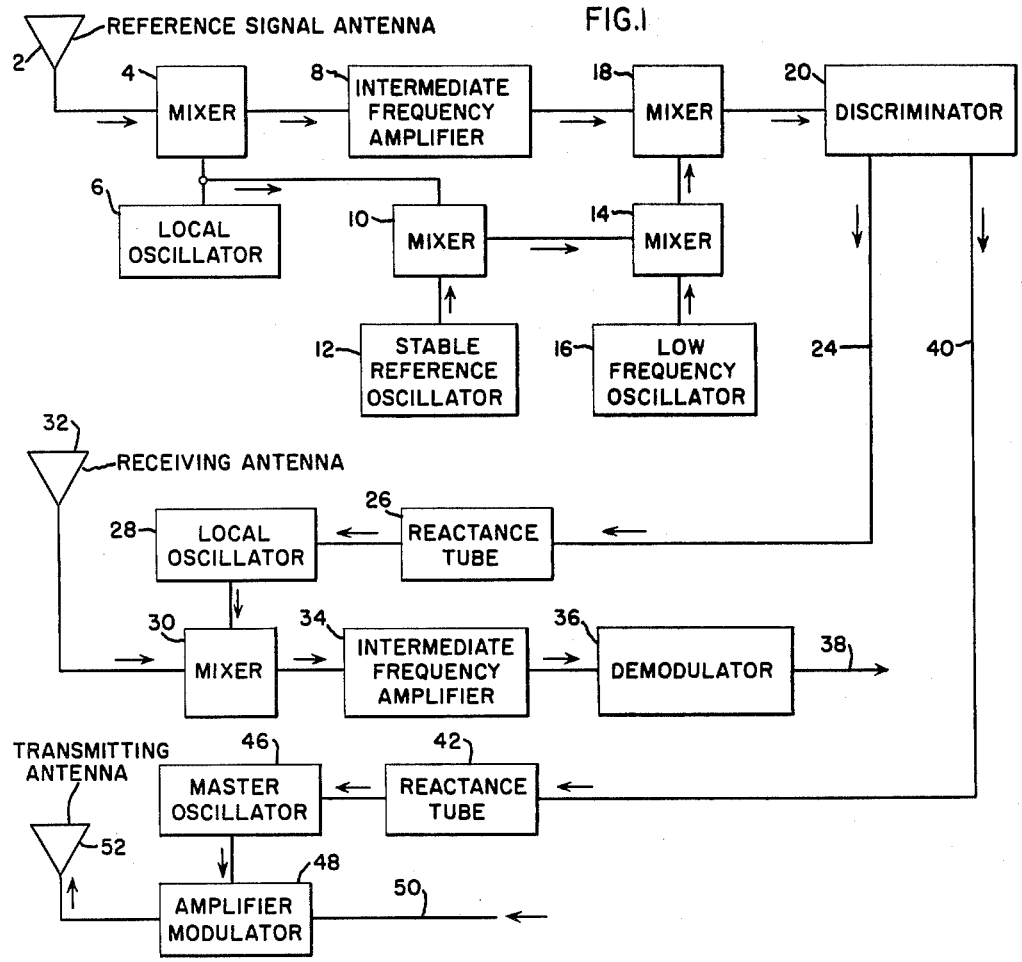
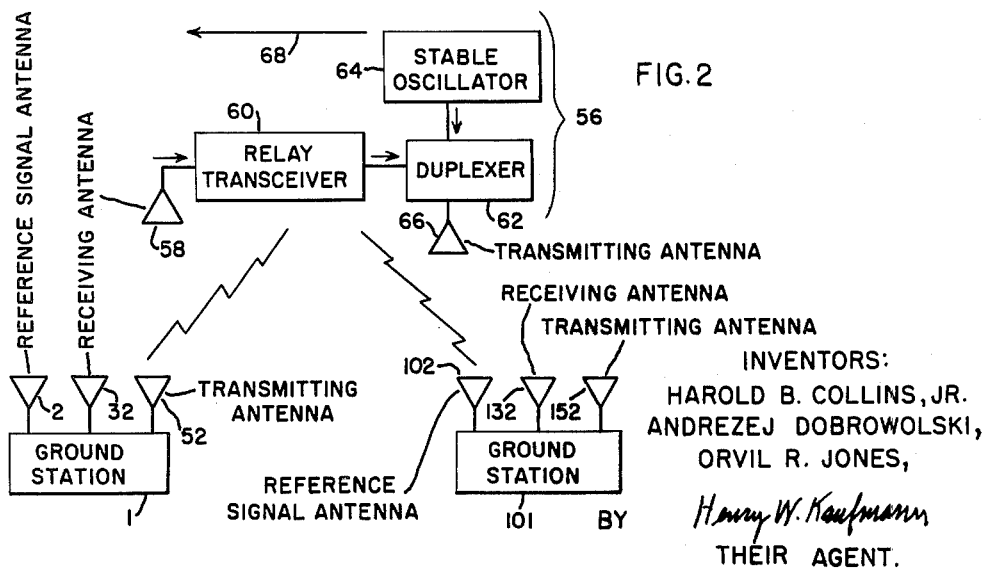
INVENTORS:
HAROLD B. COLLINS, JR.
ANDREZEJ DOBROWOLSKI,
ORVIL R. JONES,
BY *Henry W. Kaufmann*
THEIR AGENT.

3,263,173
DOPPLER EFFECT COMPENSATION
Harold B. Collins, Jr., Wayne, and Orvil R. Jones, Berwyn, Pa., and Andrzej Dobrowolski, Pacific Palisades, Calif., assignors to General Electric Company, a corporation of New York
Filed July 31, 1961, Ser. No. 171,324
2 Claims. (Cl. 325—420)

This invention pertains to the art of communication by electromagnetic radiation, and more particularly to means and method for compensating for the effects produced when two stations for such communications are in motion with respect to each other.

The Doppler effect was observed by Christian J. Doppler in 1842, and is thus somewhat older than any recorded use of narrow-band or tuned communication devices employing electromagnetic radiation, although broad-spectrum signalling (as by waving flags or lights) is, of course, much older. The Doppler effect is, basically, the occurrence of a difference between the frequency of the number of events generated at a source and the number of same events detected at an observation point when (a) the events (or their effect) have a finite, non-zero velocity of travel from the source to the observation station and (b) the source and the observation point are in motion with respect to each other. In simple terms, consider a whistle on a vehicle, being heard by a fixed observer. If the whistle is emitting 1,000 pulses per second, and the vehicle is still, the observer will detect 1,000 pulses per second. Assuming, for simplicity, that the speed of sound in the air is 1,000 feet per second, and that the observer is 1,000 feet away from the stationary whistle, there will be a delay of one second after the whistle starts to operate before the observer detects the first pulse; and he will continue to receive the last pulses for one second after the whistle stops. But the whistle pulses will arrive at the rate of 1,000 per second. However, if the vehicle begins to move away from the observer at a speed of 100 feet per second, the first one of a train of 1,000 pulses will arrive after a delay of one second, having to travel only 1,000 feet; but the last pulse of the train will leave the whistle only after the vehicle has moved to a distance of 1,100 feet from the observer. It will therefore take 1.1 seconds to reach the observer. In other words, the train of 1,000 pulses (i.e. a one-second blast of the whistle) will take more than 1 second to reach the observer; from beginning to end the blast will last 1.1 seconds so far as the observer is concerned. Since only 1,000 pulses reach the observer in 1.1 seconds, he will observe a frequency of 1,000/1.1 seconds, or 909.09 . . pulses per second. If, on the other hand, the vehicle moved toward the observer, the first pulse of a 1,000 pulse train would take 1 second to reach him, but the last, having only 900 feet to travel, would reach him in 0.9 second. Thus, the observer would receive 1,000 pulses in 0.9 second, and would observe a frequency of 1,000/0.9 seconds or 1,111.11 . . pulses per second.

It is evident that, if the observer were using some device tuned sharply to detect only pulses arriving at exactly 1,000 per second, relative motion of the whistle and the observer would render the signal undetectable. He might then make his tuned device less selective, by adjusting it to detect pulses arriving at any rate from 1,112 to 909 pulses per second; but then he would also detect extraneous noises which a more sharply tuned device would reject. Alternatively, he might tune his selective device to the frequency at which the whistle pulses were going to arrive from the moving whistle, rather than the frequency at which the whistle was generating them.

The mathematical relations involved are not complex. Letting $V_s$ stand for the velocity of the source—the whistle on its vehicle—and $V_p$ stand for the velocity of propagation—of sound with respect to the ground—and letting $T_s$ stand for the time between events at the source—the time between successive pulses emitted by the whistle—then the time interval $T_o$ between events observed by the *observer* will be $T_o = V_p - V_s/V_p$. The minus sign preceding $V_s$ is based upon the convention that the sign of $V_s$ will be positive if it is in the direction of propagation of the event toward the observer, and negative if in the opposite direction. Since frequency is reciprocal of the time between events, it is apparent that Frequency observed = Frequency at source
$$\times [V_p/(V_p - V_s)]$$

Thus the mathematics might suffice for tuning the selective device in such a way as to correct for the frequency shift in propagation. It is to the analogue of this procedure that our invention pertains.

In many conventional radio communication systems, one or more radio transmitters are fed a plurality of distinct signals of different bandwidths and the transmitters are so tuned that the separate signals appear in different distinct non-overlapping parts of the frequency spectrum with some theoretically unused guard bands between the different signals so that slight variations in the position of each signal in the frequency spectrum or errors in the adjustment of a receiving apparatus to receive the spectral range in which a desired signal lies will not cause adjacent signals to interfere with each other. If such guard bands are not used, adjacent signals may appear together where only one signal is supposed to appear, either because they actually occupy identical parts of the frequency spectrum or because they are so close together that the receiving apparatus admits components of both of them. Modern frequency control methods are sufficiently precise so that, with adequate guard bands, this conventional mode of operation is effective and satisfactory.

However, the use of carefully defined spectral ranges for the transmission of a given signal is based upon the assumption that a signal once transmitted in its allocated spectral band will remain in that band—that its frequency will not alter. As has been explained in the above discussion, the Doppler effect will cause a shift in received frequencies from those originally transmitted if the transmitter and receiver are moving with respect to each other (in other words, if the propagation path length is changing) at a speed which is appreciable as a fraction of the speed of propagation of electromagnetic radiation. When it is considered that a single voice channel in ordinary carrier telephony may be of the order of five kilocycles per second in width, and that carrier frequencies of ten thousand kilocycles per second are usable in communication, it becomes evident that a shift of one two-thousandths of a carrier frequency may be the whole width of a voice channel. The source velocity required to produce such a shift is one two-thousandths of the speed of radiation, or 93 miles per second—a magnitude which is outside the usual range of terrestrial speeds but of the proper order of magnitude to be comparable with earth satellite speeds. Public attention and private concern have been directed to the construction and inauguration into use of radio repeater stations borne by earth satellites whose altitude is such that they may be used as relay points for communication stations widely separated on the earth's surface and operating at frequency so high that no useful signal reflection by ionized layers of the atmosphere is possible. For economy of apparatus on the relay and of spectrum capacity on earth it is desirable that the Doppler frequency shifts which will result from the high relative speeds between the relay and earth-located stations should be compensated by exact tuning of the earth-located transmitters and receivers to match the shifted carrier frequency. A theoretical possibility exists of making all receivers sufficiently broad band to receive signals relayed from the relay in a satellite even after the frequency shift. This is impractical for two reasons. One is that the broad bandwidth would markedly increase the noise received, so that relay transmitter power must be increased. This is most undesirable in a system which is still pressing against the boundaries of present techniques, particularly so far as equipment weight and size are concerned. The other problem is that, for economy, it is expected to be necessary to provide in a given relay a great number of adjacent channels whose signals will be separated at the receiving station, by filters tuned to the appropriate spectral region. Doppler frequency shifts would displace the received signals so much as to render it very difficult to separate such multiple signals, not only keeping each signal separate from its neighbors, but causing each signal to appear at the particular output line where it is expected. The effect of failure to do this is perhaps best imagined by considering what a telephone system would be like whose automatic switching system had the defect of subtracting or adding a more or less arbitrarily variable number from all numbers dialed, before making a connection. It would not be commercially useful.

Our invention teaches the use of a very stable pilot transmitting source of known frequency located at the relay satellite. The signal from this pilot source is received at each ground station and its frequency as received, shifted by the Doppler effect, is compared with the known unshifted frequency of the pilot transmitter. The difference between the transmitted and received frequencies, which is the Doppler shift, is a measure of the relative speeds of the relay and the ground station. This difference frequency is applied to alter the tuning of the ground communication receiver to tune it to the arrival or shifted value of the known initial transmitting frequency of the relay communication channel it is desired to receive. Similarly, the frequency of the ground communication transmitter is adjusted to cause its frequency upon arrival at the relay, that is, its shifted value, to be the frequency for which the relay receiver has been tuned to receive transmissions from that ground transmitter. Since the relay may be moving toward one ground station and away from another ground station, while both stations are transmitting to the relay, the sign of the Doppler shift of the two signals as received at the relay will differ; and this may actually cause two signals initially transmitted at different frequencies to overlap each other as received and to interfere with each other at the relay. For this reason correction of the frequency of the ground communication transmitter is extremely important.

For the better understanding of our invention, we have provided figures of drawing, in which—

FIG. 1 represents in block diagram fashion a convenient way of executing our invention, and FIG. 2 represents in block diagram the relation between satellite borne relay and ground station.

For given relative velocities, the Doppler shift is, as the pertinent formulas clearly indicate, not a constant total frequency change, but a change of a certain fraction of the unshifted frequency. If ony a single ground station were involved, it would be feasible to employ a pilot signal which served also as the carrier for the signals transmitted to the ground station, so that the difference between the known frequency of the oscillator at the satellite and of its frequency as received at the ground station could be applied directly as the required local oscillator frequency shift. However, it is not usually economical to furnish highly stabilized carriers for every channel which is to be provided by the repeater; and such a procedure would also encounter the problem that it is not well suited to providing correction for the frequency of ground-based transmitters to be received at the proper frequency at the satellite. As a preferred embodiment, therefore, FIG. 1 represents a somewhat elaborate array of ground-based apparatus which produces a voltage which is an analogue measure of the Doppler shift, and which can be applied to a conventional reactance modulator to displace the frequency of an oscillator by an appropriate fraction of its undisplaced value without the necessity of having any specific relation between the reference frequency and the frequency of the oscillator.

In FIG. 1, reference signal antenna 2 receives a pilot signal whose frequency is the reference oscillator frequency R, as it would be measured in the satellite, plus the Doppler shift D. This signal $R+D$ is fed to a mixer 4, which is also fed the input of a local oscillator 6, whose frequency L is made higher than $R+D$. The difference $L-(R+D)$ between these two frequencies is fed to intermediate frequency amplifier 8. The output frequency L of local oscillator 6 is fed to a mixer 10, which also receives an input of frequency R from a stable reference oscillator 12. Mixer 10 produces a difference output of frequency $L-R$ and transmits this to a third mixer 14. Mixer 14 also receives an input of frequency B from a low-frequency oscillator 16. In consequence mixer 14 produces a sum output of frequency $L-R+B$, which it feeds as one input to a fourth mixer 18. The output of intermediate-frequency amplifier 8 is fed to the other input of mixer 18; this output is, of course, the same in frequency as the output of mixer 4, or $L-(R+D)$. Mixer 18 is thus receiving inputs of frequency $L-R+B$ and $L-(R+D)$, and produces a difference output of frequency $B+D$, which is fed to a conventional frequency discriminator circuit 20 which is centered at frequency B, so that, when D is zero, discriminator 20 gives zero output. When D is not zero, discriminator 20 gives an output whose sign is the same as the sign of D and whose amplitude is proportional to the magnitude of D. This assumes that amplitude limiting is applied, in accordance with usual F.M. design practice, to the input to discriminator 20.

Upon analysis of the preceding description, it will be observed that one point not emphasized is the statement that the output of stable reference oscillator 12 has a frequency R. R is actually the frequency of the reference signal from the satellite, without Doppler shift, and the allegation of identity of the frequency of oscillator 12 with R implies high stability in 12. Many ways of stabilizing oscillators to maintain their frequency constant at a predetermined value are known, going back to the Pierce quartz oscillator of the middle 1920's, and continuing through the molecular resonance devices of the present. Attention is invited to the fact that the stability of the local oscillator 6 is not critical to the functioning of the device, as its frequency is ultimately subtracted from itself, and the frequency of oscillator 16 may be a small number times the maximum Doppler shift, so that conventional conservative design will render it adequately stable.

The apparatus thus far described functions to produce from discriminator 20 one or more outputs (two output lines are represented) whose sign represents the sign of the Doppler shift and whose amplitude is a measure, linear within the usual limitations of linearity of frequency-sensitive discriminators, of the magnitude of the Doppler shift.

Output 24 of discriminator 20 is applied to adjust the frequency of the communication receiving system by being fed to a reactance-tube frequency control device 26 which controls the frequency of local oscillator 28, in accordance with the potential on line 24. Actually, in physical construction the reactance tube and its ancillaries would probably be located with the oscillator, but the separate representation emphasizes the presence of 26. The frequency of local oscillator 28, ideally, should be adjusted so that it is shifted in the same direction as the frequency of the signal received on antenna 2 has been shifted from the reference oscillator frequency R; and it should be shifted by an absolute amount (i.e., a number of kilocycles per second) which is the same fraction of the nominal frequency of the communication signal relayed from the satellite-borne repeater that the Doppler shift of the signal received on antenna 2 is of the frequency R. More briefly, the local oscillator 28 must be displaced in frequency by the same number of kilocycles per second as the Doppler displacement of the communication signal from the relay. Mixer 30 receives this signal from antenna 32 and beats it with the output of local oscillator 28, the difference output being then fed to intermediate-frequency amplifier 34 whose output in turn is fed to a discriminator or second detector or synchronous detector, or other final demodulator 36 appropriate to the modulation scheme being used. The demodulated output, whether audio, video, Teletype or any other form of information signal, is provided at line 38 for further uses of no direct concern to the present invention.

It will be observed that the discussion preceding, concerning the amount of frequency displacement required of local oscillator 28 in response to signals in line 24, revealed that the frequency displacement of 28 must be linear, within the limits of the art, with the potential on line 24. This is the same relation required of an oscillator for linear frequency modulation by an incoming audio signal, and well known to be obtainable.

Discriminator output on line 40 is directed to adjust the frequency of communication transmission so that the shifted signal received at the relay moving in space will be the value for which the relay receiver is tuned. This eliminates both the necessity for any adjustment of receiving equipment in the comparatively inaccessible relay and the objectionable possibility that the signal will be received by the wrong relay receiver and thus retransmitted over the wrong relay transmitting or output channel. The frequency correction to be applied to a signal transmitted from the ground is somewhat different from that to be applied to the receipt of a signal received on the ground. If, for example, the distance between the ground station and the relay is decreasing, the signal received at the ground will be raised in frequency by the Doppler effect, and the local oscillator frequency must be raised by an equal amount on the communication receiver. A signal transmitted from the ground will also be raised in frequency by the Doppler effect, as it appears on its arrival at the satellite, and the frequency of the ground transmitter must be lowered by a proportionate amount in order that it may have the proper value on arrival at the satellite-borne receiver. For this reason a separate line 40 from discriminator 20 is provided as an indication that line 40 carries a signal whose function is the negative of the function of the signal on line 24. This negation of function may be accomplished either by applying the signal of line 24 to an inverting amplifier and applying this output to line 40, or by providing a second discriminator circuit in rectangle 20 with diodes reversed in polarity with respect to those in the first discriminator circuit, or by any of a number of other known strategems. In any event, the signal appearing on line 40 is applied to a reactance-tube frequency control 42 which controls the frequency of master oscillator 46 in such manner that, when the frequency of signal arriving on antenna 2 is increased, the frequency of master oscillator 46 is proportionately decreased. The output of oscillator 46 is then applied to final amplifier-modulator 48, which also receives modulating signals of whatever origin on line 50, and feeds the modulated output to antenna 52.

It is of course apparent that many possible variations of radio receivers and transmitters and frequency control means are applicable to the practice of our invention, and that they are far too numerous to be here recited in detail.

For completeness of disclosure, we have provided FIG. 2 in which the assembly 1 surmounted by antennas 2, 32 and 52 represents the ground station as represented in FIG. 1, and an assembly 101 represents a different but similar ground station surmounted by homologous antennas 102, 132, and 152. Details of 1 and 101 are omitted for compactness. A group marked 56 represents the equipment of the satellite-borne relay, where antenna 58 represents an antenna broad-band enough to receive all the various signals directed to the relay, a rectangle 60 represents a relay transceiver comprising a plurality of receiving-transmitting channels whose outputs are fed to duplexer 62, where they are combined with the reference signal provided by stable oscillator 64, and transmitted by transmitting antenna 66. An arrow 68 represents the direction of travel of the satellite. It will be observed that this is toward ground station 1, and away from ground station 101, so that it is evident that the sign of the Doppler shift will differ for the two stations, but consideration of the disclosed mode of operation of our invention will establish that independent correction applied at each differently located ground station as we have disclosed will permit successful operation without the inclusion of elaborate compensating equipment in the satellite where it will be costly to locate and maintain.

For general reference to frequency modulation and frequency control techniques, attention is invited to the book "Frequency Modulation" by Hund, published by the McGraw-Hill Book Company, 330 W. 42nd Street, New York, N.Y., and to the publications of the Institute of Radio Engineers, 1 East 79th Street, New York, N.Y.

What is claimed is:

1. A radio station adapted to compensate automatically for Doppler frequency shift in transmission between itself and a remote station comprising: a pilot signal receiving antenna, a first mixer connected to receive signals therefrom at a first frequency, a local oscillator connected to feed a part of its output to the said first mixer, an amplifier connected to receive the output of the said first mixer and to amplify the said output and feed the amplified said output to a second mixer; a second mixer; a stable oscillator, a third mixer connected to receive a part of the output of the said local oscillator and to receive the output of the said stable oscillator and to feed an output to a fourth mixer; a low-frequency oscillator; a fourth mixer connected to receive the output of the said low-frequency oscillator and of the said third mixer and to feed an output to the said second mixer; a discriminator connected to receive an output from the said second mixer and to produce a discriminated output representative of the frequency of the said output from the said second mixer; means for applying the said discriminated output to radio communication apparatus to alter the operating frequency of the said apparatus by an amount equal to the said Doppler frequency shift at the said operating frequency, the said operating frequency being different from the said first frequency.

2. A radio station adapted to compensate automatically for Doppler frequency shift in transmission from a remote transmitting apparatus, moving relatively to the said station, of communications signals received at the said station from the said remote transmitting apparatus, comprising:

Means for receiving a pilot signal transmitted at a predetermined known first frequency from the said remote transmitting apparatus, the said pilot signal being shifted by the Doppler effect during transmission so that upon its arrival at the said station it has a second frequency different from the said first frequency and for deriving from the said pilot signal as received at the said station at the said second frequency a control signal representative of the algebraic difference between the said known first frequency and the said second frequency;

Communication signal receiving means tuned to receive band of frequencies different from the said first frequency and the said second frequency and having a center frequency, and tunable by application of a control signal to displace, in frequency, the said band of frequencies;

Means for applying the said control signal to the said communication signal receiving means to tune that means to displace the said band of frequencies by an amount bearing the same ratio to the center frequency of the undisplaced said band that is borne by the difference between the said first and second frequencies to the said first frequency, and of the same algebraic sign.

References Cited by the Examiner

UNITED STATES PATENTS

| | | | |
|---|---|---|---|
| 2,790,072 | 4/1957 | Hugenholtz | 325—17 |
| 2,974,222 | 3/1961 | Lawson | 325—17 |
| 3,024,459 | 3/1962 | Gleeg | 343—8 |
| 3,072,904 | 1/1963 | Yaffee | 325—63 |
| 3,076,192 | 1/1963 | Brown | 343—112 |

KATHLEEN H. CLAFFY, *Primary Examiner.*

ROBERT H. ROSE, *Examiner.*

E. C. MULCAHY, R. S. BELL, *Assistant Examiners.*